United States Patent
Mauk et al.

(10) Patent No.: US 7,186,453 B2
(45) Date of Patent: Mar. 6, 2007

(54) RESILIENT FLOOR COVERING WITH REGENERATIVE, DIRT-REPELLENT SURFACE

(75) Inventors: Hanns-Joerg Mauk, Mundelsheim (DE); Heinz von Olnhausen, Bietigheim-Bissingen (DE); Peter Petzold, Besigheim (DE); Siegfried Reichert, Erligheim (DE)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/725,117

(22) Filed: Dec. 2, 2003

(65) Prior Publication Data

US 2004/0161588 A1 Aug. 19, 2004

Related U.S. Application Data

(63) Continuation of application No. PCT/EP02/05567, filed on May 21, 2002.

(30) Foreign Application Priority Data

May 29, 2001 (DE) ................. 101 26 122

(51) Int. Cl.
| B32B 3/00 | (2006.01) |
| B32B 3/28 | (2006.01) |
| B32B 3/30 | (2006.01) |
| B32B 27/00 | (2006.01) |
| B32B 5/16 | (2006.01) |

(52) U.S. Cl. ............... 428/156; 428/327; 428/167; 428/143; 428/147; 428/908.8; 428/484.1

(58) Field of Classification Search ............... 428/156, 428/167, 147, 143, 206, 327, 908.8, 484.1
See application file for complete search history.

(56) References Cited

U.S. PATENT DOCUMENTS

| 2,828,219 | A | * | 3/1958 | Heiges et al. ........... 428/455 |
| 3,129,194 | A | * | 4/1964 | Kupits ................. 524/273 |
| 3,518,215 | A | * | 6/1970 | Apikos ................. 524/249 |
| 4,336,293 | A | * | 6/1982 | Eiden ................. 428/143 |
| 4,501,783 | A |   | 2/1985 | Hiragami et al. ........... 428/147 |
| 4,816,319 | A | * | 3/1989 | Dees et al. ............ 428/167 |
| 4,886,708 | A |   | 12/1989 | Marchal .............. 428/447 |
| 6,013,329 | A | * | 1/2000 | Berenger ............. 427/493 |

FOREIGN PATENT DOCUMENTS

| DE | 236 091 | 5/1986 |
| EP | 0 149 868 | 7/1985 |
| EP | 0 742 098 | 11/1996 |

* cited by examiner

*Primary Examiner*—Alicia Chevalier
*Assistant Examiner*—Catherine A. Simone

(57) ABSTRACT

A resilient floor covering with a regenerative, dirt-repellent surface contains a matrix based on natural and/or synthetic materials and at least one substance that is capable of migrating within the matrix and the amount of the substance is in excess of its compatibility in the matrix. The resilient floor covering according to the invention preferably has an embossed surface and a matrix, into which a particulate material with greater hardness than that of the matrix is incorporated. The floor covering is characterized by improved soiling behavior and increased wear resistance.

8 Claims, No Drawings

RESILIENT FLOOR COVERING WITH REGENERATIVE, DIRT-REPELLENT SURFACE

CROSS REFERENCE TO RELATED APPLICATIONS

This application is a continuation of international application serial no. PCT/EP02/05567, filed on May 21, 2002, which was published in the German language, which is hereby incorporated herein by reference, and which claims priority of German application serial no. 101 26 122.5-26, filed on May 29, 2001.

TECHNICAL FIELD

The present invention concerns a resilient floor covering with improved dirt-repellent surface and improved wear resistance. The invention particularly concerns a resilient floor covering with a matrix based on natural and/or synthetic materials, containing at least one substance incompatible with the matrix. The resilient floor covering according to the invention is characterized by improved soiling behavior and increased wear resistance.

BACKGROUND OF THE INVENTION

Resilient floor coverings based on natural and/or synthetic material, i.e., floor coverings having a matrix or binder based on natural and/or synthetic materials, for example, linoleum floor coverings, floor coverings based on polyolefins, PVC floor coverings, etc., are used extensively.

In addition to the excellent use properties of resilient floor coverings, especially PVC floor coverings, but also floor coverings based on other plastics or based on natural materials, the floor coverings exhibit a more or less strong tendency toward soiling during use, depending on the type and amount of filler or fillers and other additives, which leads to a deterioration in the optical properties in the floor covering.

Under practical conditions, this effect is countered, for example, by special cleaning, and sometimes also care substances that are applied to the floor covering, in order to protect or restore the desired optical properties.

Normally, highly polymer-containing wax dispersions are applied to the floor covering for this purpose. The dispersions that form a 5 to 10 μm thick film acts as a wear layer until it is gradually worn off by use.

These coatings, which are formed by the polymer-containing wax dispersions soon after being applied, form so-called tracks from stresses of different intensities. These tracks must be repaired or restored, which represent an expenditure. This occurs by complete so-called thorough cleaning, in which the coating is removed with strongly alkaline cleaning agents and a new coating then applied. This is comparatively cost-intensive, since the entire floor surface, whether it requires repair or not, must be cleaned and coated again. In addition, the floor surfaces involved cannot be walked on for at least a day.

A partial attempt has been made to eliminate the aforementioned drawbacks by using a dry cleaning method, in which the upper layer of the coating is polished with appropriate grinding agents, so-called grinding pads, in order to remove the tracks and the dirt adhering in the scratches and grooves. However, this is also associated with surface material removal, in which there is the added difficulty that heavy and expensive machines are necessary for grinding. Therefore, the coating cannot be removed from all locations because of the lack of access or because of the size and weight of the machines.

For some years, synthetic floor coverings, especially PVC floor coverings, have therefore increasingly been sealed with coatings based on polyurethane (so-called PU sealants), in order to reduce the cleaning and restoration costs. Such PU sealants, which can be water-based, or solvent-free, for example. The UV-cured coatings normally have a layer thickness in the range from about 5 to about 50 μm.

PU sealants are relatively resistant and can even be polished in the presence of wax fractions.

However, PU sealants have the drawbacks, among other things, that they tend to form relatively deep and pronounced scratches, depending on the frequency and intensity of stress, so that the tracks are significantly soiled and convey a seriously deteriorated optical impression. In addition, PU sealants, in contrast to many care films and coatings, have the additional drawback. Because of their irreversible curing, they cannot be repaired, but they must be fully removed with substantial equipment demands, whereupon a new PU sealant must be applied, which is naturally connected with high costs.

The task of the present invention is therefore to provide a resilient floor covering based on natural and/or synthetic materials that has a surface with improved dirt repellency, i.e., reduced tendency toward soiling, with simultaneously high wear resistance.

BRIEF SUMMARY OF THE INVENTION

This task is solved with the object characterized in claim 1. Preferred variants of the floor covering according to the invention are defined in the dependent claims.

DETAILED DESCRIPTION

The invention is based on the finding that a highly wear-resistant surface with excellent dirt-repellent properties can be imparted to a resilient floor covering by adding to the matrix or binder of the floor covering at least one substance that is incompatible with the material of the matrix and, if the at least one substance has limited compatibility with the matrix material, in an amount so that the compatibility limit is surpassed.

Because of the deliberate incompatibility of at least one substance with the matrix material of the floor covering, the at least one substance migrates slowly, but continuously from the floor covering to the surface of the floor covering and thus forms a continuously renewing protection, even when the substance migrating to the surface is worn or abraded off by walking on the floor covering.

The material for the matrix and binder of the floor covering according to the invention is not subject to any special restriction and can be chosen from polyvinyl chloride (PVC), ethylene-vinyl acetate copolymer (EVA), homo- and copolymers of ethylenically unsaturated compounds, ethylene/alkyl acrylate copolymers, ethylene/propylene/diene mixed polymers (EPDM), diene-containing block copolymers and linoleum. The aforementioned materials can be present individually and in appropriate mixtures.

The floor coverings according to the invention can be both homogenous floor coverings and heterogeneous floor coverings. Homogeneous floor coverings according to DIN EN 12466 (1997) are floor coverings constructed from one or more layers with the same composition and color, which are patterned continuously through the entire thickness of the covering. Heterogeneous floor coverings consist of a wear layer and additional compact layers that differ in composition and/or pattern and can contain a stabilizing layer.

The floor coverings according to the invention can be applied to a support and comprise a nonwoven material or fabric, for example, a reinforcing fabric. Natural and synthetic, both inorganic and organic materials, like jute, polyester nonwoven material and fabric, nonwoven material and fabric from encapsulated polyester fibers, glass fibers, etc., can be used for such purposes. The matrix or binder in the floor coverings according to the invention preferably contains at least one polymer and/or at least one copolymer. A particularly preferred polymer is then PVC.

The term PVC employed here is understood to mean a polyvinyl chloride obtained by ordinary polymerization methods, like suspension polymerization (S-PVC), emulsion polymerization (E-PVC) and bulk polymerization (M-PVC), with a plasticizer content greater than 12 wt. %, and is referred to as PVC. PVC with a plasticizer content of more than 12 wt. % is also referred to as soft PVC.

Technical polyvinyl chlorides normally have molecular weights of about 30,000 to 130,000 g/mol, which correspond to K-values of about 45 to about 80. However, polyvinyl chlorides with K-values of about 100 are also commercially available.

In principle, all ordinary plasticizers can be used as plasticizers in the floor coverings according to the invention, like phthalic acid esters, trimellitic acid esters, phosphoric acid esters, benzoic acid esters, polymer plasticizers, like polyesters from adipic, sebacic, azelaic and phthalic acid with diols, etc.

Esters of phthalic acid are preferred according to the invention, such as dioctyl phthalate (DOP), bis-2-ethylhexyl phthalate, diisononyl phthalate (DINP), diisododecyl phthalate (DIDP), dibutyl phthalate (DBP), diethyl phthalate (DEP), benzylbutyl phthalate (BBP), butyloctyl phthalate, dipentyl phthalate and the like.

Resilient floor coverings based on PVC contain plasticizer-containing PVC as a binder and ordinary additives, such as fillers, dyes, like pigments and organic and inorganic dyes, and auxiliaries.

Chalk, barium sulfate, slate flour, silica, kaolin, quartz flour, talc, lignin, cellulose, glass, textile or glass fibers, cellulose fibers and polyester fibers can be used as fillers in an amount of preferably 25 to 60 wt. % based on the total weight of the floor covering component containing the filler.

The floor covering can also contain ordinary auxiliaries, like antioxidants, antistatic agents, stabilizers, UV absorbers, blowing agents, fungicides, slip additives and processing aids in the usual amounts.

In comparison with resilient floor coverings made from other polymers or polymer mixtures, PVC floor coverings have excellent properties, especially with respect to wear resistance, soiling behavior and long lifetime. PVC floor coverings, as already mentioned, are provided with a surface finish or a coating (for example, polymers containing wax dispersions or PU sealant) on the exposed working side, to increase wear resistance, but especially to improve dirt-repellent properties and to prevent scratches and tracks.

Resilient floor coverings ordinarily have a thickness in the range from about 1 mm to about 4 mm, preferably about 1.5 mm to about 3 mm, and more preferably about 2 mm.

If the floor covering contains a matrix or binder based on PVC, the floor coverings according to the invention involve PVC with a plasticizer content of more than 12 wt. %. The PVC preferably contains a plasticizer, for example, dioctyl phthalate (DOP), in an amount of about 20 wt. % based on the total weight of the floor covering component containing the plasticizer, including filler(s) and optionally additional additives.

The PVC has a K-value in the range from 40 to 80, preferably in the range from 65 to 70.

The floor covering ordinarily contains at least one particulate filler, for example, an inorganic filler, in an amount of about 25 to about 60 wt. % based on the total weight of the floor covering component containing the filler.

The floor coverings according to the invention can have a transparent coating or a transparent surface finish based on soft PVC, in which the thickness of the coating can be about 10 µm to about 100 µm, a thickness of about 40 µm to about 80 µm being preferred. The coating thickness is normally about 50 µm.

The PVC employed in the coating has a K-value of about 60 to about 80, preferably about 80. The ratio of PVC to plasticizer in the coating lies in the range from about 80 wt. % to about 20 wt. %, preferably from about 60 wt. % to about 40 wt. %, and more preferably from about 70 wt.% to about 30 wt.% based on the sum of PVC and plasticizer.

The coating is transparent in the floor coverings according to the invention. However, fillers and other additives can be introduced in the coating mass as long as the transparency is not reduced below a desired pre-stipulated degree, for example, to achieve a certain optical effect.

In principle, the matrix of the coating can consist of a material different from that of the actual floor covering. However, preferably the matrix materials of the coating and the floor covering are the same.

The present invention is based on the finding that the soiling behavior, in particular, of a resilient floor covering can be improved by adding at least one substance to the floor covering that is incompatible with the matrix material. If the substance has a limited compatibility with the matrix material, it must be added in an amount so that the compatibility limit is substantially surpassed.

It has been found in the context of the present invention that addition of at least one substance incompatible with the matrix means that this substance is slowly separated from the floor covering, migrating to the surface. This effect can be measured by time measurement of surface tension and surface energy, for example, immediately after production of the floor covering and at time intervals thereafter. Depending on the type of material employed as matrix and the substance or substances incompatible with it, a change in surface tension can be found even after a short time, for example, within a few hours after production of the floor covering. For example, it was found that the surface energy of the PVC floor covering diminishes by addition of amide waxes from about 40 dyne/cm to less than 25 dyne/cm within a few days. On the other hand, since migration progresses very slowly, the substance or substances incompatible with the matrix will emerge from the surface of the floor covering over a very long period, so that a continuously renewing "protective film" is formed, even if the substance emerging from the surface is partially or temporarily even continuously worn off in the region of walking tracks during walking on the floor covering.

This continuously forming or renewing "protective film" leads to a distinct improvement in soiling behavior, i.e., to a significantly improved dirt repellency, so that the floor covering retains its attractive optical properties over a comparatively longer period.

Another advantage of the floor covering according to the invention is that it can be cleaned and cared for simply.

Wax-like substances, silicone oils and fluorinated hydrocarbons can be used according to the invention as a substance or substances incompatible with the matrix.

Since silicone oils and fluorinated hydrocarbons, when added in high amounts, cause a deterioration of the soiling behavior of the floor coverings to a certain extent and can lead to turbidity, which leads to an adverse effect on transparency, especially in a coating, wax-like substances are preferred according to the invention.

A consistent definition of the term "wax-like substance" has been created in the technical world. It is understood to mean a group of substances with the same or similar use properties that are caused by special physical properties. According to the now recognized definition, the term "wax" or "wax-like substance" is a collective technical designation for a number of natural and artificially produced substances that can be divided into the four main groups of natural waxes, modified natural waxes, partially synthetic waxes and fully synthetic waxes.

A physical property common to waxes or wax-like substances is that they melt above 40° C. without decomposition. It is preferred according to the invention that a mixture of at least two wax-like substances be used as the substance incompatible with the matrix, in which the wax-like substances differ at least on melting point. Because of this, the temperature behavior of the floor coverings according to the invention is favorably influenced, since a continuously renewing protective film forms even at different temperatures to which the floor covering is exposed (for example, even after longer periods). It has been found that a difference in melting points of at least 10° C., preferably of at least 20° C., has a favorable effect on the effect according to the invention of improving the soiling behavior of the floor covering.

Among the wax-like substances according to the invention, the amide waxes, i.e., the reaction products of fatty acids with amines, are preferred.

It is known to add waxes as an antiblocking agent to soft PVC mixtures, from which films are produced. It is also known that certain fatty acid amides are added as lubricants during production of synthetic floor coverings in an amount of about 0.5 to 1.0 wt. % based on the total weight of the floor covering material. In floor coverings based on PVC, for example, additives of up to 1 wt. % fatty acid amide are recommended as lubricants during processing. However, in this amount range, the compatibility limit of the fatty acid amide in the PVC mass is still not surpassed, so that the effect according to the invention cannot occur.

According to the invention, the substance incompatible with the matrix or a mixture of at least two incompatible substances is added in an amount of 1.5 wt. % to about 15 wt. %, preferably 2 wt. % to about 12 wt. %, and more preferably 2.5 wt. % to about 10 wt. % based on the matrix material.

The incompatible substance(s) can be added in a floor covering that has a coating to both the mixing composition for the floor covering and the mixing composition for the coating. However, it is preferred to add the incompatible substance(s) only to the mixing composition for the coating in such a case, because this limits the hazard that the incompatible substance(s) will also migrate to the surface of the floor covering opposite the wear layer, and then possibly exert an abrading effect on the gluability of the floor covering to the substrate.

If the incompatible substance(s) is/are added only to the mixing composition for the coating, the amount is preferably about 1.5 wt. % to about 6 wt. % based on the matrix material of the coating. An amount of about 1.5 wt. % to about 5 wt. % is more preferred, and about 2 to 4 wt. % is most preferred.

The resilient floor coverings according to the present invention are produced in known fashion by premixing all the components, such as polymer binder, incompatible substance(s), dyes, fillers, additives, processing aids and other auxiliaries, and plasticizing and granulating them by means of equipment such as closed mixers, twin-shaft extruders, planetary roll extruders. The granulate particles are then pressed in compaction equipment, like calenders, double-belt presses or static presses, to a web or panel. The employed granulates are ordinarily of different colors, in order to produce a patterned floor covering.

To produce floor coverings based on PVC, PVC plastisols are ordinarily applied in the coating process to a support layer and then gelled. The plastisol layer can then be provided as print carrier for corresponding decorative configuration or patterning of the coating with a multicolor gravure printing.

It has been found in the context of the present invention that the soiling behavior, improved by incorporating incompatible substances in the floor covering, can be further improved if the surface of the floor covering is provided with a predetermined structure. This can be achieved, for example, with an embossing roll.

The predetermined structure preferably is a uniform embossing or embossing with a regular pattern of elevations and recesses. It has been found that the effect of additional surface structuring is most pronounced if the average spacing between profile peaks in the centerline, corresponding to the so-called Sm value or groove spacing Sm according to DIN 4768, lies in a range of greater than 200 μm and less than 1000 μm.

With respect to height of the elevations (average depth of roughness $R_z$ according to DIN 4768) of the embossed material, a value in the range from 20 μm to 200 μm has been proven advantageous.

The reason for the improvement in soiling behavior by the additional surface structuring has still not been clarified in detail. Without intending to establish a specific theory, it is assumed, however, that because of the increase in surface of the floor covering resulting from embossing, the amount of dirt occurring ends up on a larger amount of incompatible substance that migrated to the surface, thus forming a more effective protective film. Embossing should also have an effect on the wettability of the floor covering and therefore on the penetration of dirt particles into the recesses of the embossing and subsequent adhesion of the dirt particles.

A further improvement of use properties of floor coverings according to the invention, especially with respect to wear resistance, can be achieved by incorporating a particulate material with a greater hardness than that of the matrix material into the matrix or mixing composition for the floor covering. In floor coverings provided with a coating or surface finish according to the present invention, it is sufficient for the particulate material with greater hardness to be added only to the mixing composition for the coating or be incorporated in the surface of the resulting coating. The harder particulate material, however, can also be incorporated in the floor covering itself, so that increased wear resistance over the entire cross section of the floor covering is achieved.

It is particularly favorable for the improvement of wear resistance, if the particles with greater hardness are incorporated in the surface of the coating or floor covering so that they are not fully surrounded by the mixing composition forming the floor covering, but protrude from the surface over part of their diameter. This can be achieved by spreading the particulate material with greater hardness than the matrix material onto the still unconsolidated or hardened surface of the coating or floor covering after production, and then pressing it into the surface, for example, by means of rolls, so that the particles still protrude to a certain degree from the surface.

Another possibility consists of adding the particles with greater hardness already to the mixing composition before production of the floor covering or coating, and then carrying out embossing of the obtained surface incompletely, so that the raised sites of the embossed floor covering or the embossed coating do not fully enter the recesses of the embossing roll. This also results in a situation in which the particles with greater hardness are still exposed in the surface and protrude partly from the surface.

This has the dual effect that, on the one hand, greater resistance is offered to abrasion because of the higher hardness of the (partially) protruding particles, and, on the other hand, the situation is prevented in which the protective film, produced by migration of the incompatible substance (s), is worn off too quickly by walking on the floor covering.

The nature of the particulate material is subject to no special restriction and can be both inorganic and organic. However, it is preferred that the particulate material with a greater hardness than the matrix material be formed based on a polymer.

The particles of the material with the greater hardness preferably have a largest diameter in the range of about 2 μm to about 100 μm, in which the diameter in floor coverings or coatings with a structured surface should be chosen with respect to the Sm value and roughness.

The particulate material with greater hardness is incorporated in the floor covering or coating in an amount of about 1 wt. % to about 20 wt. % based on the total amount of matrix material. The amount preferably lies in the range from about 3 wt. % to about 15 wt. %, and more preferably in the range from about 5 wt. % to about 10 wt. %.

Special PVC types with a K-value of about 100 that have a plasticizer content of more than 12 wt. % have proven to be particularly suitable as material for the particles of greater hardness in the context of the present invention. These particles are particularly suited for floor coverings or coatings, whose matrix material is based on PVC, since the K-value of these PVC types used for the matrix normally lies in the range from about 40 to about 80 and the PVC particles with greater hardness (K-value about 100) are not affected during plasticization of the PVC.

The invention claimed is:

1. A floor covering comprising a composition including a binder, a plasticizer and a substance capable of migration within the composition, wherein the binder comprises polyvinyl chloride (PVC), the plasticizer is in an amount of at least about 12 wt. % based on PVC, and the substance capable of migration is present in an amount of from about 1.5 wt. % to about 15 wt. % based on the binder, and wherein the floor covering has a profile with elevations and recesses, the average spacing between profile peaks in the centerline is more than about 200 μm and less than about 1000 μm, and the difference in height between the elevations and the recesses is from about 20 μm to about 200 μm.

2. The floor covering according to claim 1, wherein the substance capable of migration is a wax-like substance.

3. The floor covering according to claim 2, wherein the wax-like substance is selected from the group consisting of a partially synthetic wax, a fully synthetic wax, a natural wax, a modified natural wax and mixtures thereof.

4. The floor covering according to claim 2, wherein the wax-like substance comprises an amide wax.

5. The floor covering according to claim 1, wherein the floor covering further comprises a substrate and a coating, the coating comprising the binder, plasticizer and substance capable of migration.

6. The floor covering according to claim 5, wherein the coating comprises a particulate material having a hardness greater than the hardness of the PVC of the coating.

7. The floor covering according to claim 1, wherein the composition comprises a particulate material having a hardness greater than the hardness of the PVC.

8. The floor covering according to claim 7, wherein the particulate material comprises a polymer.

* * * * *